Inventor
Harvey D. Geyer
Blackmor, Spencer & Flint
Attorneys

Patented Mar. 11, 1941

2,234,755

UNITED STATES PATENT OFFICE 2,234,755

CLUTCH THROW-OUT BEARING

Harvey D. Geyer, Dayton, Ohio, assignor to General Motors Corporation, Detroit, Mich., a corporation of Delaware Application April 3, 1939, Serial No. 265,726

7 Claims. (Cl. 192—68)

This invention relates to clutches. It is the result of an effort to improve the clutch which is used to releasably couple the engine shaft of a motor vehicle with the input shaft of the change speed transmission.

An object of the invention is to improve the arrangement by which the throw-out means, together with the spring and pressure plate is maintained in a centralized position.

Other objects and advantages will be understood from the description which follows.

Figures 1, 2, 3:
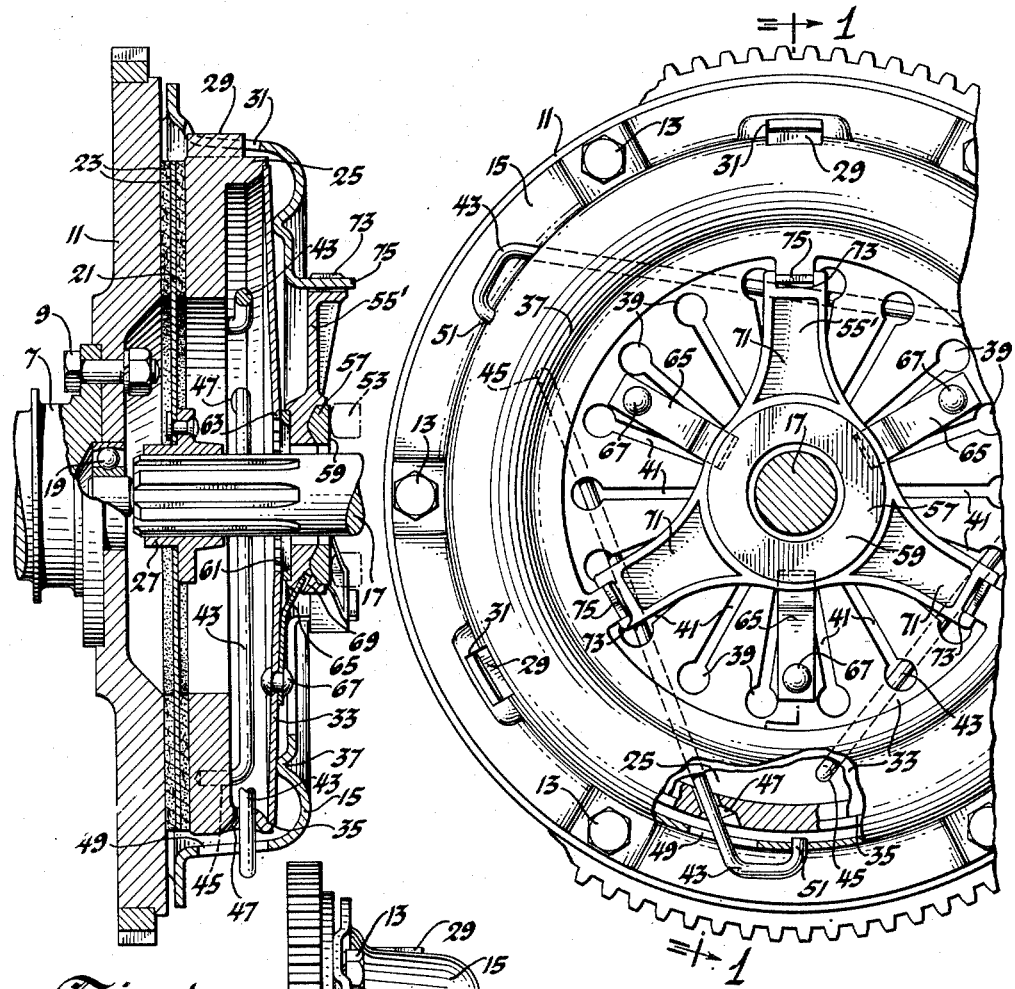
Figure 1 is a transverse section through the clutch, the section being on line 1—1 of Figure 2.
Figure 2 is a view in elevation, partly broken away and in section.
Figure 3 is a sectional view showing the clutch in released position, this figure showing a slight modification.

Referring by reference characters to the drawing, numeral 7 represents the engine shaft to which is secured a flywheel 11 by fastening means 9. Secured to the flywheel at 13 is a cover 15. The driven shaft 17 is coaxial with the engine shaft and is shown provided with a pilot bearing 19. The driven shaft carries a driven plate 21 with facings 23, one of which is adjacent the flywheel and the other of which is adjacent a pressure plate 25. The driven plate 21 is secured to a hub 27 carried slidably but non-rotatably by shaft 17. The pressure plate is mounted to move axially but to rotate with the flywheel and its cover. To that end it has a plurality of lugs 29 extending through slots 31 in the cover.

To grip the driven plate between the flywheel and pressure plate there is a spring marked 33. In the disclosure it takes the form of a coned disc contacting a shoulder 35 around the marginal edge of the pressure plate. The pressure plate and spring are thus kept in centralized position relative to each other. The coned spring disc is somewhat flattened in the process of assembly wherein it engages a circular abutment 37 formed on the cover plate. Radially inward from the line of contact at 37 the spring has openings 39 and slots 41. Torsion springs 43 have ends anchored to the pressure plate as at 45. They extend somewhat tangentially and pass through openings 47 in the pressure plate. They then extend through openings 49 in the cover plate and are anchored thereto as at 51. These springs are torsionally strained when the pressure plate is moved into clutch engaging position. When the load of the main spring is taken from the pressure plate they serve to move the pressure plate away from the driven plate.

The invention is particularly concerned with the means to release the clutch. At 53 are shown what may be considered the ends of a throw-out fork. When operated the throw-out bearing 55 engaged by the fork is reciprocated. This bearing 55 is preferably of metal. It may be the product of a die casting process, or it may be formed by stamping or otherwise manufactured. If made of any metal other than cast iron as in Figure 1, where it is identified by numeral 55' it is preferred to associate with it a cast iron ring 57. This ring has a surface 59 machined to a plane perpendicular to the axis of the clutch. This ring 57 is to be secured to the throw-out bearing 55' in any way preferred. If bearing 55' is formed by a process of die casting the ring 57 may be inserted in the mold. If 55' is formed by stamping the stamping may be press fitted on the ring 57. The bearing 55 carries a hardened steel ring 61 affording a circular line contact with the inner ends of the fingers 63 formed between the slots 41. This ring 61 is held in a counterbore of the bearing 55 as shown. In order to secure together the bearing 55 and the spring 33 there are a plurality of flat spring members 65 riveted at 67 to certain of the spring fingers and having their ends entered in grooves 69 of the bearing. To accurately centralize the bearing it has a plurality of arms 71 with terminal notches 73. These notches receive axial extensions 75 formed on the cover.

By the arrangement described above the sliding support for the bearing 55, and with it the spring and pressure plate, insures a centralized position for this assembly. The connection of the bearing to the spring 33 and the support of the latter on the circular shoulder of the pressure plate serves to centralize these parts when the bearing is itself held in central position. It is therefore unnecessary to make any provision at the outer margin of the pressure plate for centralizing the pressure plate.

In the operation of clutch release the bearing ring 61 assumes the load of the spring 33 taking the load from contact at 37 whereupon the torsion springs pull the pressure plate toward the cover and release the grip on the driven plate.

I claim:

1. In a clutch, a first driving member, a second and axially movable driving member, a driven member, a spring acting on the second driving member whereby the driven member is gripped between the driving members, a throwout bearing for said spring, said first driving member and said bearing having parts rigid therewith and interengaging to prevent relative rotation but to permit relative axial reciprocation and operable to center said bearing relative to said first driving member.

2. In a clutch, a first driving member, a second and axially movable driving member, a driven member, a spring acting on said second driving member whereby the driven member is gripped between the driving members, a throwout bearing to take the load of said spring from said second driving member, said second driving member having an annular shoulder, said spring being peripherally supported and centered on said shoulder, means to connect said spring and bearing and means independent of said spring to centrally support said bearing relatively to said first driving member.

3. The invention defined by claim 2, said centralizing means comprising radial arms on said bearing, said first driving member and the ends of said arms having cooperating supporting and centralizing members.

4. The invention defined by claim 2, said centralizing means comprising radial arms on said bearing, said arms having terminal slots and said first driving member having axial arms extending into said slots.

5. The invention defined by claim 2, said connecting means comprising radially extending resilient arms secured to said spring and operably connected to said bearing.

6. In a clutch, a first driving member, a second and axially movable driving member, a driven member, a spring acting on the second driving member whereby the driven member is gripped between the driving members, a throw-out bearing to take the load of said spring from said second driving member, said spring being a coned disc, said second driving member having a circular marginal lug to support said coned disc centrally relative thereto, spring fingers attached to said coned disc and operably connected to said bearing, cooperating means on said first driving member and said bearing to support said bearing in centralized position relative thereto.

7. The invention defined by claim 6, said first driving member including a flywheel and a cover, said cover cooperating with said bearing to effect said centralization.

HARVEY D. GEYER.